United States Patent [19]

Katsuma et al.

[11] Patent Number: 4,494,850

[45] Date of Patent: Jan. 22, 1985

[54] FLASH PHOTOGRAPHING SYSTEM

[75] Inventors: Makoto Katsuma; Masaharu Kawamura; Masanori Yamada, all of Kanagawa, Japan

[73] Assignee: Canon Kabushiki Kaisha, Tokyo, Japan

[21] Appl. No.: 505,082

[22] Filed: Jun. 16, 1983

[30] Foreign Application Priority Data

Jun. 21, 1982 [JP] Japan .................................. 57-107250
Jun. 22, 1982 [JP] Japan .................................. 57-107482

[51] Int. Cl.³ .......................................... G03B 15/05
[52] U.S. Cl. ................................................. 354/416
[58] Field of Search .............. 354/416, 417, 429, 431, 354/480, 481, 483

[56] References Cited

U.S. PATENT DOCUMENTS 3,438,313 4/1969 Topaz .............................. 354/481 X
3,710,701 1/1973 Takishima et al. .................. 354/417
3,823,411 7/1974 Hasegawa et al. .............. 354/429 X
4,210,849 7/1980 Naya et al. ....................... 354/416 X Primary Examiner—William B. Perkey
Attorney, Agent, or Firm—Toren, McGeady and Stanger

[57] ABSTRACT

The disclosed flash photography system operates in a first mode by controlling the flash on the basis of the distance information signals, and in a second mode by controlling the flash in response to the flash illumination of the object to be photographed. The system insures accurate flash photography by shifting from the first mode to the second mode when the camera uses a lens with a short focal length or with an attached filter.

32 Claims, 11 Drawing Figures

FLASH PHOTOGRAPHING SYSTEM

BACKGROUND OF THE INVENTION

1. Field of the Invention

This invention relates to cameras and particularly to camera flash photography systems with automatic exposure controls.

2. Description of the Prior Art

Known automatic exposure control systems for flash cameras include three types. In the first type, a light sensitive element in a flash receives light reflected from an object to be photographed and the flash's light is adjusted by stopping the flash emission when the amount of light reaches a predetermined value.

A second type involves a TTL light adjusting system wherein the light sensitive element is within a camera and receives light emitted from a flash and reflected from an object to be photographed through the camera's lens aperture. The flash illumination is adjusted by stopping the flash emission when the quantity of the light received reaches a prescribed value.

A third system adjusts a flash's light emission by computing a guide number on the basis of an aperture setting value and the distance information obtained from the distance ring of a lens or its position, and by controlling the flash emission according to the computed guide number.

However, all of these prior art systems have shortcomings which render them incapable of insuring a correct exposure.

In the first of these systems, namely, the external light adjusting system, the light sensitive element is independent of the camera's main optical system. Thus, the picture is not taken with the same light that reaches the exposure adjusting light sensitive element. Therefore, the light quantity for the main photographic region cannot accurately be detected. Also, the quantity of light received by the light sensitive element varies with the reflection factor of the the object to be photographed. It is thus impossible to make a correct exposure.

In the second, or TTL light adjusting system, the quantity of light received also varies with the reflection factor of the object being photographed. Therefore, a correct exposure is scarely possible.

In the third system, the one which adjusts the flash's emission on the basis of the distance, the light emission is determined by the aperture value and the object distance. Hence, adjustment errors in the object distance and the aperture value are inevitably reflected in the precision of the light adjustment.

The above shortcoming of the system which adjusts flash emission on the basis of distance (hereinafter called the distance light adjusting system) is particularly significant when used with a wide angle lens. The probability of obtaining a correct exposure drops greatly when a wide angle lens used. The reason for this is as follows:

To simplify the explanation, we consider an example where a single lens is in use. Assuming the distance from the surface of a film to an object to be photographed is R, the focal length of the lens is f and a distance from the film surface to lens position is X as shown in FIG. 1 of the accompanying drawings, the following relation obtains:

$$1/X + 1/(R-X) = 1/f$$

Assuming that the lens is shifted relative to the film surface from a position focusing on infinity $\infty$ to a position focusing on another object at a distance R over a distance $\Delta X$, the lens shift $\Delta X$ can be expressed as:

$$\Delta X = f^2/(R-2f)$$

Therefore, the lens shift $\Delta X$ required for focus adjustment to a given object distance is smaller when the focal length f of the lens is shorter. Conversely, when the shift $\Delta X$ is assumed to be unvarying, a shorter focal length lens produces a wider range over which an object is in focus within the scope of the lens shift than a lens of longer focal length. This means that even a very small shift of a shorter focal length lens changes the focusing distance substantially. In other words, with a wide angle lens, the lens position precision has a greater influence on the focusing distance than a lens whose angle is not as wide. Where the setting of a photo-taking lens is detected by a position detecting device, and an object distance setting value signal is obtained from the position detection, an error in the distance value signal is determined by the precision of the detecting device. In other words, if detecting device of the same detecting precision is used for detecting the setting of a telephoto lens and that of a wide angle lens, the signal representing a detected distance will have a greater error with the wide angle lens.

Let us now assume that the precision of the position detecting device for detecting the setting of the phototaking lens is ±0.1 mm. In this condition, when the lens is shifted $\Delta X$ to focus it on an object located at a distance of 4 m, and then the shifted position of the lens is detected by the position detecting device, the above-stated degree of precision of ±0.1 mm causes the detecting device to detect the lens shift as $\Delta X$ ±0.1 mm. Accordingly, the detecting device produces a signal representative of a preset distance value corresponding to the lens shift of $\Delta X$ ±0.1 mm. However, the setting of the lens is 4 m when the lens shift is $\Delta X$ as mentioned. With the lens position shift thus deviating ±0.1 mm from $\Delta X$, the distance setting range of a 35 mm f=35 mm, is from 3 m to 5.9 m as shown in FIG. 2 of the accompanying drawing. Thus, the detection error of ±0.1 mm causes the setting distance value signal to represent 3 m—5.9 m despite of the fact that the lens has been set for a distance of 4 m by shifting it $\Delta X$. With the lens whose f=35 mm, therefore, the setting distance of 4 m results in an error between −1 m and +1.9 m.

With a 28 mm lens, i.e., f=28 mm, which has a wider angle than the 35 mm lens, the ±0.1 mm error for the lens shift $\Delta X$ affects the distance range to as great a degree as the ratio of the variation of the lens setting distance value to the variation of the lens shift and is greater in a wide angle lens than in a telephoto lens as mentioned in the foregoing. In this instance, as shown in FIG. 2, the setting distance range becomes 2.7 m—8 m with the 28 mm lens shifted $\Delta X$ ±0.1 mm. The above-stated detection error of ±0.1 mm then causes the distance signal to represent 2.7 m—8 m while the distance is set for 4 m by shifting the lens $\Delta X$. Therefore, with a 28 mm lens the distance setting of 4 m results in an error between −1.3 m and +4 m. Where a lens setting is detected by a distance setting detecting device to obtain a distance setting value signal in this manner, the detecting precision of the detecting device affects the accuracy of the distance setting value signal. The signal error increases as the angle of the wide angle lens increases.

In the aforementioned distance light adjusting method, a guide member is obtained by computing the product of the aperture value and value of the distance to the object and the quantity of light to be emitted by the flash is made to correspond to the guide member to ensure a correct exposure. Therefore, when a distance setting value is obtained by the position detecting device and the guide member is obtained by computation on the basis of the distance value thus obtained, the detecting error affects the accuracy of an exposure substantially. The error in the detected distance value signal relative to the distance setting value of the lens becomes very high particularly when a wide angle lens is used.

FIG. 3 shows the degrees of deviation from a correct exposure when the quantity of a flash's light is controlled by obtaining a lens setting distance value signal using the aforementioned position detecting means. When the object to be photographed is located at a distance of 4 m, for example, the range of possible deviation from the correct exposure is from an under-exposure by about 1.2 step to an over-exposure by about 2 steps with a 28 mm lens and is from an under-exposure by about 0.8 step to an over-exposure by about 1.1 step with a 35 mm lens as shown in FIG. 3.

Therefore, light adjustment based on distance is not suitable for flash photography with a wide angle lens because of the extremely low probability of a correct exposure.

These disadvantages are applicable not only to light adjusting systems which respond to a distance in order to control the total flash emission, but to all systems which limit the flash emission on the basis of a distance. For example, they apply to exposure control for a flash by using a distance value signal and a guide number to set an aperture.

Another disadvantage of light adjustment on the basis of distance arises from the fact that the flash output is determined by the aperture and the distance to an object. Hence, when the light coming through the objective lens is altered by an ND filter or the like, the exposure will be diminished by the light reduction through the objective lens.

Furthermore, the use of intermediate adaptor that alters the focal length, such as a teleconverter also makes it impossible to obtain a correct exposure. In other words, a device such as an extension ring for close-up photography will multiply the actual aperture by (M+1) and the aperture will make the picture darker than the aperture value indicated by the graduations on the lens due to the increase in magnification and multiplication by M. This results in a difference between the actual aperture value and the set aperture value or value indicated by the lens graduations. Therefore, the so-called light adjusting arrangement which controls the flash emission on the basis of an aperture setting and a set distance hardly insures a correct exposure.

SUMMARY OF THE INVENTION

An object of the present invention is to provide a flash photography system which solves the above-stated shortcomings of the prior art. This involves a flash control circuit which is operable either in the distance light adjustment mode or in the TTL light adjustment mode, detecting means for detecting the value of the focal length of the lens used and a mode selection circuit which is arranged to select one of the modes of the control circuit according to the result of detection by the detecting means. The flash's light is controlled in the distance light adjusting mode when the focal length of the lens used is longer than a predetermined length, i.e. when a lens of a long focal length like telephoto lens is in use. This solves the problem of the reflection factor of the object to be photographed which is the shortcoming of the TTL light adjusting and external light adjusting methods. The flash's light is controlled in the TTL light adjusting mode or a mode other than the distance light adjusting mode when the focal length of the lens in use is short, i.e., when a wide angle lens is in use. This solves the problem that inheres in the distance light adjusting method.

Another object of the invention is to provide a flash photography system which is capable of eliminating the shortcomings of the above-stated distance light adjusting and TTL light adjusting methods while effectively utilizing the advantages of these systems. To attain this object, the system according to the invention controls the flash by automatically shifting the system from the distance light adjusting mode to the TTL light adjusting mode when the lens is used with a lens accessory such as a filter or an intermediate adapter that varies the quantity of a transmission light, so that flash photography can be accomplished with the light adjusting mode automatically selected to suit the photo-taking condition.

These and further objects and features of the invention will become apparent from the following detailed description of preferred embodiments when taken in connection with the accompanying drawings.

DETAILED DESCRIPTION OF THE PREFERRED EMBODIMENTS

Figure 1:
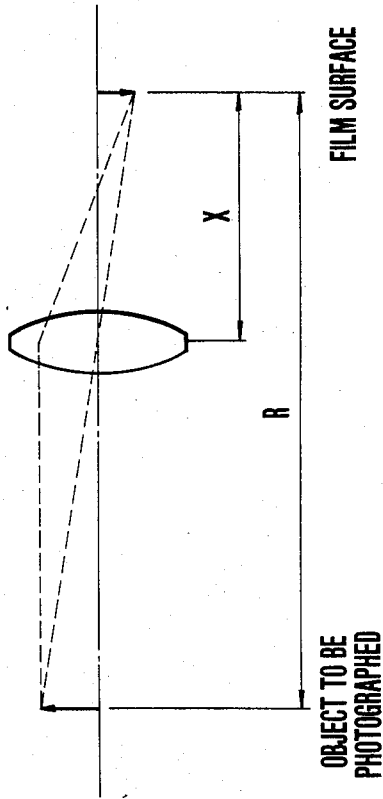
FIG. 1 is a schematic illustration of an optical system showing the relation of the focal length of a lens to the focus adjustment thereof.
Figure 2:
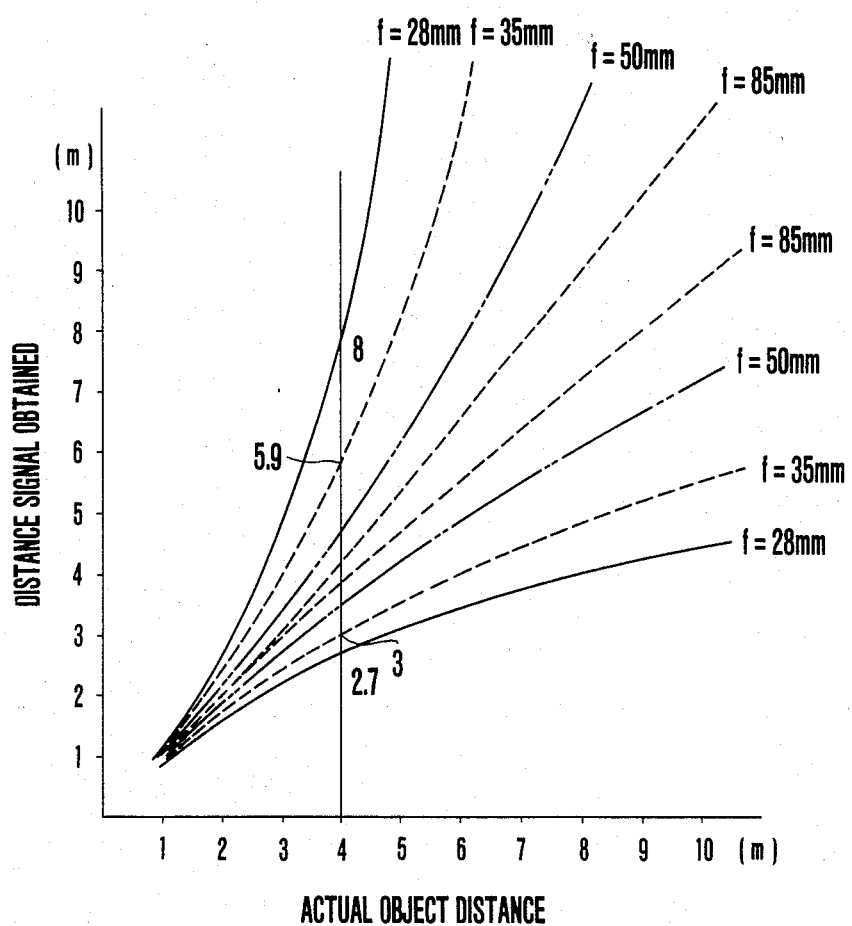
FIG. 2 is a graph showing the relation of setting distance values to object distance values in relation to the focal length of the lens.
Figure 3:
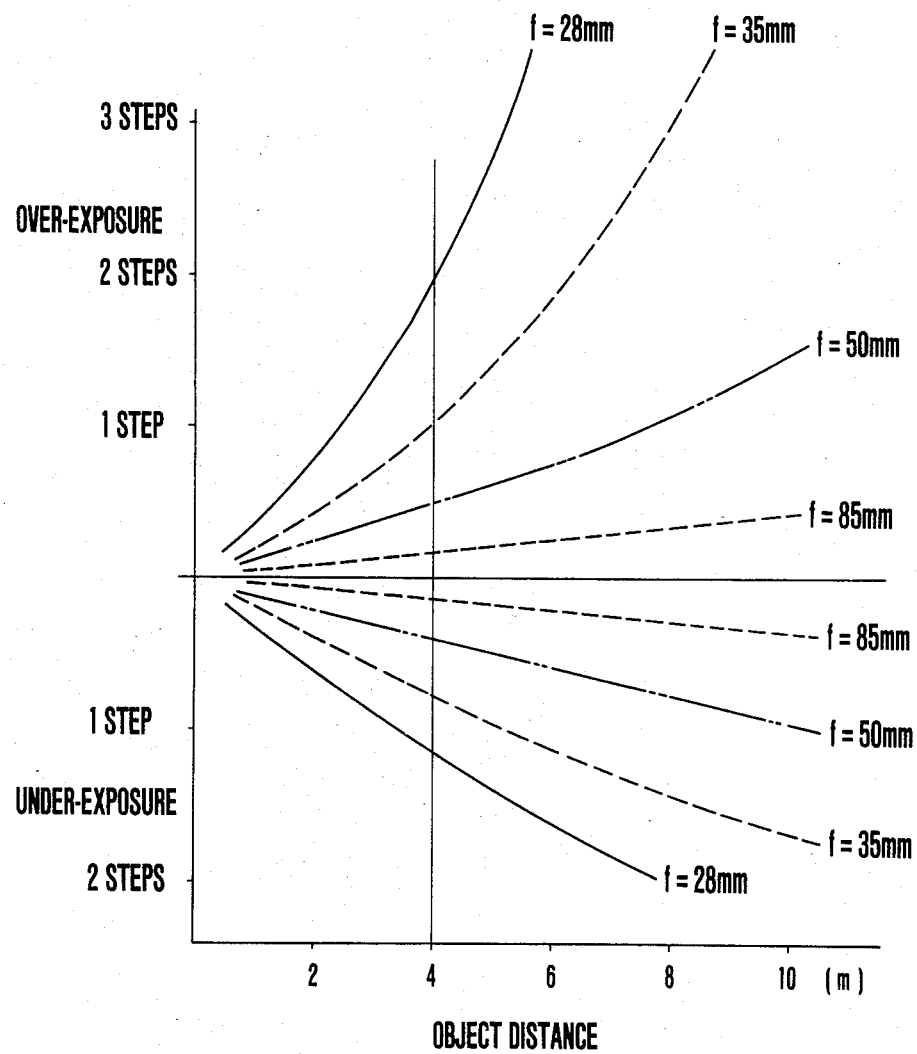
FIG. 3 is a graph showing the relation of the focal length of the lens to exposure errors resulting from the distance light adjusting method.
Figure 4:
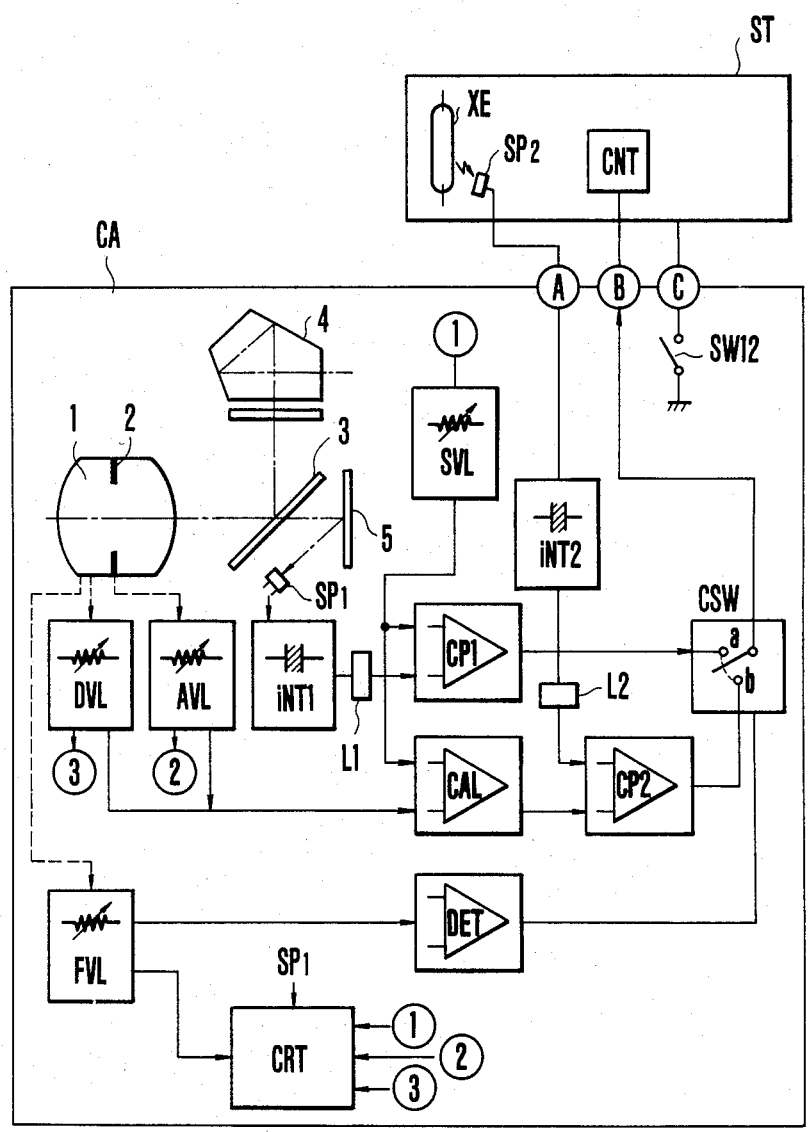
FIG. 4 is a block diagram showing a flash photographing system as an embodiment of the present invention.

FIG. 4 shows in a block diagram a flash and camera system according to the invention. Here a camera CA includes a photo-taking lens 1 such as an interchangeable lens or the like and a set distance signal forming arrangement DVL in the form of a variable resistor or the like. This signal forming arrangement DVL is adapted to produce an output corresponding to the logarithmic value of a set distance in response to a focusing ring disposed on the photo-taking lens barrel. In accordance with the invention, however, this arrangement does not have to be a variable resistor which may be replaced with a digital switch, a digital code plate or the like. A reference numeral 2 indicates a diaphragm. A symbol AVL indicates set aperture signal form arrangement in the form of a variable resistor or the like and is arranged to produce an output corresponding to the logarithmic value of a set aperture value in response to an aperture setting ring. For this means, use of the variable resistor may be replaced with a digital switch or a digital code plate or the like in the same manner as in the set distance signal forming means DVL. The camera includes a moving mirror 3 which is arranged to block an optical path leading to a pentagonal prism 4 during an exposure in response to a shutter release operation by moving upward from the position shown in the drawing. A light sensitive element SP1 is arranged to receive a portion of light which strikes a film surface 5 via the lens and is reflected by the film surface 5.

A reference symbol FVL indicates a focal length information signal forming arrangement, which produces an output corresponding to the focal length of the lens mounted on the camera, the output being arranged to be produced in response to a signal member or the like provided on the photo-taking lens. The focal length information forming means FVL is composed of a variable resistor, a digital switch, a digital code plate or the like.

A focal length detection DET detects the output of the focal length information forming arrangement FVL and is arranged to connect a change-over circuit CSW to a contact point "a" when the output of the information forming arrangement FVL represents a focal length shorter than a prescribed focal length such as f=35 mm and to connect the change-over circuit CSW to a contact "b" when the output represents a focal length longer than the prescribed focal length. If the focal length information forming arrangement is a variable resistor, the detector DET is formed by a comparator arranged to have a reference potential impressed on one of the input terminals of the comparator while the output voltage of the variable resistor is impressed on the other input terminal. However, if the focal length information forming arrangement is a digital switch, the detection DET is composed of a magnitude comparator or the like that discerns a digital value. The change-over circuit CSW is composed of a transistor change-over circuit arranged to perform a switching action by the output of the detector DET or may be composed of a gate selector or the like composed of an analog switch or a logic element.

The output of the light sensitive element SP1 is integrated by an integration circuit iNT1. The output of the integration circuit iNT1 is logarithmically suppressed by a suppressing arrangement L1, which thus produces a suppressed value of the value of light quantity received by the light sensitive element SP1. The camera CA is provided with film sensitivity information forming arrangement SVL which is arranged to produce an output corresponding to a logarithmic value of film sensitivity set in response to film sensitivity setting arrangement. The film sensitivity information forming arrangement is composed of a variable resistor or a digital switch or the like.

When the output of the above-stated suppressing arrangement reaches a prescribed value corresponding to that of the film sensitivity information forming means SVL, a light emission stop signal forming circuit CP1 which is provided for the TTL light adjusting mode produces a light emission stop signal. The light emission stop signal forming circuit is formed by a comparator or the like.

A computing circuit CAL computes the outputs of the elements DVL, AVL and SVL and is arranged to produce an output corresponding to a logarithmic value of quantity of light emission necessary for appropriate flash photography based on the setting value obtained from each of these elements.

A light emission stop signal forming circuit CP2 which is provided for the distance light adjusting mode is arranged to detect the output of the computing circuit CAL and that of suppressing arrangement L2 to be described. The circuit CP2 produces a light emission stop signal when these two outputs reach a prescribed relation. This circuit CP2 is arranged in the same manner as the circuit CP1.

The embodiment further includes a flash device ST which is mounted on the camera CA. The flash device ST comprises a flash tube XE; a light sensitive element SP2 which is arranged to receive the flash light of the flash tube XE; and a light adjusting circuit CNT which, in response to the light emission stop signal, causes the flash tube to stop flashing. The light adjusting circuit is arranged to operate either in a series control manner or in a parallel control manner.

The flash device ST is connected to the camera CA by terminals A, B and C.

The light sensitive element SP2 is connected via the terminal A to an integration circuit iNT2. The integration circuit iNT2 integrates the output of the light sensitive element SP2 and produces an output corresponding to the emission quantity of the flash. The integration circuit iNT2 is connected to the suppressing arrangements L2, which is arranged to produce an output corresponding to the logarithmic value of the integration output, that is, an output corresponding to the logarithmic value of quantity of the flash light received as mentioned in the foregoing.

The outputs of the signal forming arrangements DVL, AVL, SVL and FVL and that of the light sensitive element SP1 are supplied to an exposure computing circuit CRT, which is arranged to control an exposure time on the basis of the setting value of film sensitivity, an aperture value and a light measurement output.

The light sensitive elements SP1 and SP2, the light emission stop signal forming circuits CP1 and CP2, the computing circuit CRT, the integration circuits iNT1 and iNT2 and the light adjusting circuit CNT jointly form a flash control circuit.

A lens to be used in accordance with the present invention has a signal pin or the like which is arranged to serve as a focal length information source. The length of the pin is, for example, determined according to the focal length of the lens. When the lens is mounted on the camera, the pin causes a moving member which is disposed on the camera to move as much as the length of the pin. Then, the resistance value of the above-stated focal length information forming means is determined by the extent of displacement of the moving member. A setting value of the focal length of the lens is obtained in this manner.

The embodiment shown in FIG. 4 operates in the following manner:

When a wide angle lens whose focal length is shorter than the focal length of a lens of a prescribed angle of view is mounted on the camera, the output of the focal length information forming means FVL is above a prescribed value. The detector DET therefore acts to connect the change-over circuit to the contact "a". Let us assume that the control mode of the camera has been shifted to a flash photography mode and that aperture and distance adjusting actions also have been completed. When a shutter release operation is performed in this condition, the mirror 3 moves upward and a leading curtain of the shutter travels in a known manner. In response to that, a synchronizing switch SW12 turns on. A trigger circuit which is not shown triggers the flash tube XE to initiate a flash.

An object to be photographed is then irradiated by the light of the flash. Light caused by the flash and reflected by the object reaches the surface of a film through a preset diaphragm aperture 2 of the lens 1. Light reflected by the film surface is received by the light sensitive element SP1. The output of the light sensitive element SP1 is integrated by the integration circuit iNT1. An integrated value thus obtained is logarithmically suppressed by the suppressing arrangement L1. As a result of this, a logarithmic value of the light quantity received by the light sensitive element SP1 is transmitted to the light emission stop signal forming circuit CP1. When the logarithmic value satisfies a predetermined relation to the output of the film sensitivity information forming means SVL, the light emission stop signal forming circuit CP1 produces the light emission stop signal.

The change-over circuit CSW is in contact with the contact "a" as mentioned in the foregoing. Therefore, the light emission stop signal is transmitted to the light adjusting circuit CNT via the change-over circuit CSW and the terminal B to stop the flash tube XE from flashing. An operation in the TTL light adjusting mode is carried out in this manner. Meanwhile, the shutter time is of course adjusted to a predetermined sychronizing shutter time of, say, 1/60 sec.

When a long focus of telephoto lens of a longer focal length than the prescribed length is used, the output of the focal length information forming means is below a prescribed value. Accordingly, the detector DET produces a switching signal to connect the change-over circuit CSW to the contact "b".

Let us now assume, as in the case of the TTL light adjusting operation, that the flash photography mode has been selected and that presetting of an aperture and distance adjusting have been completed. When a shutter release operation is performed in this condition, the mirror 3 moves upward. The leading curtain of the shutter travels. The synchronizing switch SW12 turns on. The flash tube XE flashes.

The flash from the flash tube XE is received by the light sensitive element SP2. The quantity of the flash's light appears in the output of the integration circuit iNT2 in the form of an integrated value of the output of the light sensitive element SP2. The output of the integration circuit iNT2 is logarithmically suppressed by the suppressing arrangement L2 and is supplied to the light emission stop signal forming circuit. In the meantime, the computing circuit CAL computes the preset aperture value, distance value and film sensitivity value received from the signal forming means DVL, AVL and SVL. The computing circuit CAL then produces a logarithmic value signal representative of a flash light quantity required for appropriate flash photography. This signal is transmitted to the light emission stop signal forming circuit. When the output of the suppressing arrangement L2 satisfies a prescribed relation to the output of the computing circuit CAL, the light emission stop signal forming circuit produces a light emission stop signal. This stop signal is transmitted to the light adjusting circuit CNT via the change-over circuit CSW and the terminal B. This stops the flash emission of the flash tube XE. An operation in the distance light adjusting mode is carried out in this manner. The shutter time is of course also adjusted to a synchronizing shutter time value in this case.

In accordance with the invention, as has been described in the foregoing, the light adjusting mode is automatically selected according to the focal length of the lens in use so that flash photography can be carried out in a manner most suited to the characteristic of the lens.

The description of the embodiment shown in FIG. 4 is based on the assumption that the lens used is an interchangeable lens. However, a zoom lens is also usable for the embodiment. The automatic selection between the TTL light adjusting mode and the distance light adjusting mode is of course feasible in that instance according to the setting of the zoom lens. In that instance, the length of the focal length signal pin is arranged to be variable in response to the zoom ring of the zoom lens so that the focal length of the lens can be transmitted. Further, in the embodiment, in carrying out flash photography in the distance light adjusting mode, the light emitted by the flash tube XE is received by the light sensitive element SP2 and the quantity of the flash light is integrated and then is compared with a computed value. The flash is brought to a stop when a predetermined relation obtains between the two values compared. However, the invention is not limited to such arrangement and the arrangement may be replaced with various modifications such as: A modification in which a restricting circuit serves for restricting the charge quantity of the main capacitor of the flash device; and the quantity of flash light to be emitted is controlled by restricting beforehand the charge quantity according to a computation output of the computing circuit CAL before flashing the tube. Another modification example includes a timer which performs a time counting action according to the output of the computing circuit; and the flash time is controlled in the basis of the computation output of the computing circuit. In any case, the quantity of the flash's light can be controlled on the basis of a setting value of distance.

Further, the embodiment includes two light emission stop signal forming circuits, one for the TTL light adjusting mode and the other for the distance light adjusting mode. However, the two signal forming circuits may be replaced with a single light emission stop signal forming circuit which is arranged as follows: The input of the circuit is provided with an input switch-over circuit which is arranged to be controlled according to the output of the detector DET. In the case of the TTL light adjusting mode, the outputs of the suppressing arrangement L1 and the film sensitive information forming arrangement SVL are allowed to be received. Meanwhile, in the case of the distance light adjusting mode, the outputs of the computing circuit CAL and the suppressing arrangement L2 are allowed to be received. In this instance, the output part of the light emission stop signal forming circuit of course does not have to be provided with the change-over circuit CSW.

While the light emission stop signal forming circuits are disposed on the side of the camera in the specific embodiment described in the foregoing, the circuits may be arranged on the flash device. Further, the flash device may be incorporated in the camera to combine the two into one unified structure.

In the specific embodiment, the integration circuits and the suppressing means are separately provided for the TTL light adjusting mode and for the distance light adjusting mode respectively. However, these integration circuits and these suppressing means may be singly arranged respectively with light sensitive elements arranged to be switched over from one to the other to have the output of one of them selectively supplied to the integration circuit at the time of the TTL light adusting mode or the distance light adjusting mode.

The specific embodiment is arranged to use a signal pin disposed on the lens for transmitting information on the focal length of the lens to the camera. However, this arrangement may be replaced with the following arrangement in which: some focal length signal forming means such as a resistor or the like is arranged on the lens to produce an electrical signal corresponding to the focal length and to supply it directly to the detector DET. This arrangement of course dispenses with the focal length information forming means FVL.

While the embodiment is arranged to have distance adjustment manually accomplished, this arrangement can be of course change, in the case of an automatic focusing device, to supply distance information detected by the automatic focusing device directly to the computing circuit CAL.

Figure 5:
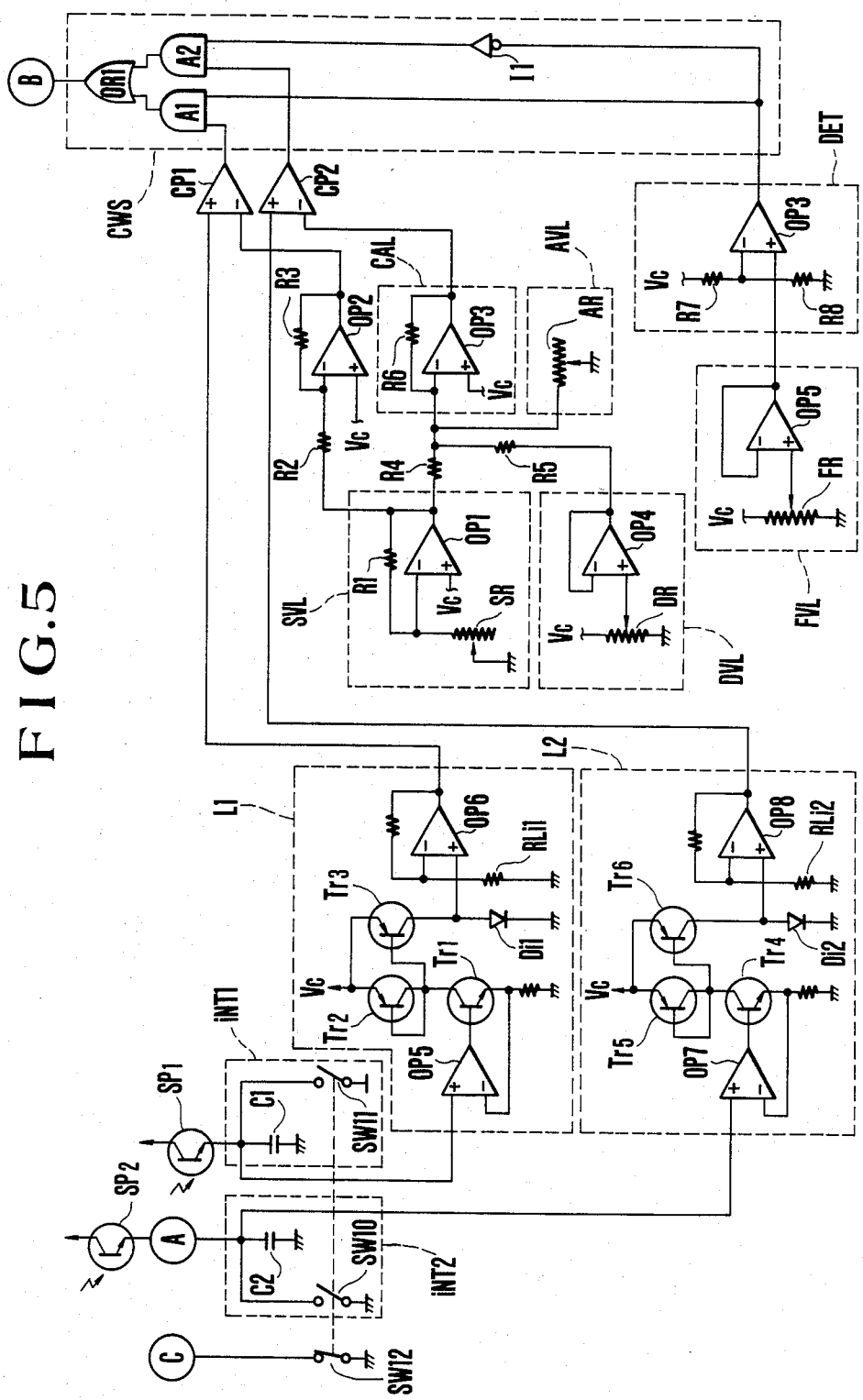
FIG. 5 is a circuit diagram showing by way of example a camera CA shown in FIG. 4.
Figure 6:
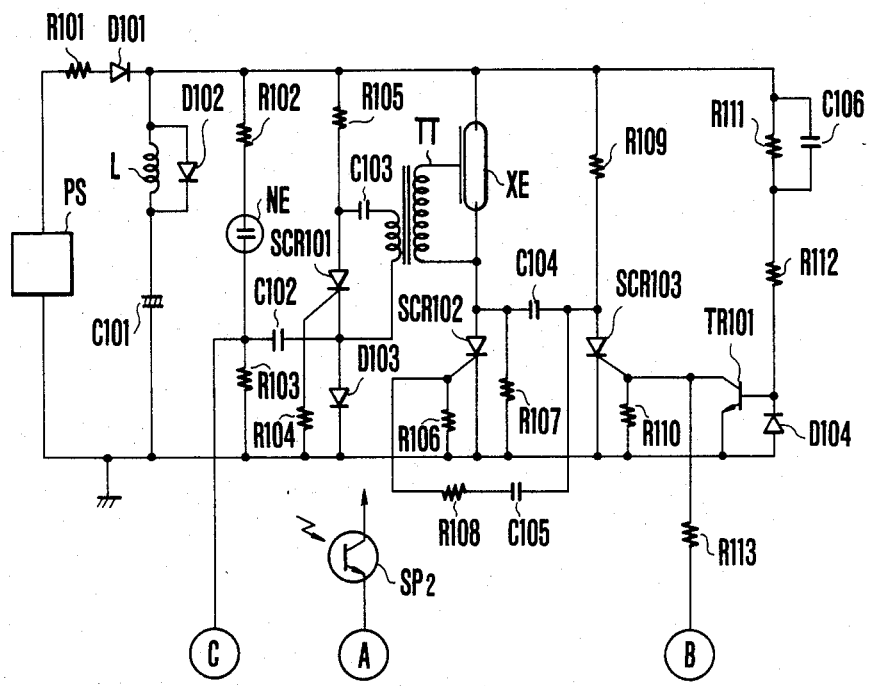
FIG. 6 is a circuit diagram showing by way of example a flash device ST shown in FIG. 4.
Figure 7:
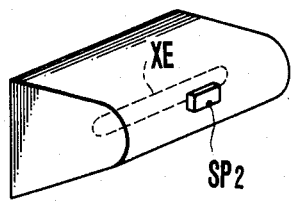
FIG. 7 is a schematic illustration showing the arrangement of a light sensitive element in relation to a discharge tube XE.

FIGS. 5, 6 and 7 show by way of example more specific arrangements of the flash photography system of FIG. 4.

FIG. 5 shows a specific example of the camera CA shown in FIG. 4. Here, the camera CA includes a variable resistor FR which is interlocked with a signal member of the photo-taking lens. The resistance value of this variable resistor FR varies with the focal length of the lens. A buffer amplifier OP5 which is connected in a full feedback manner is arranged to have the potential of its output become higher for a shorter focal length according to the resistance value of the variable resistor FR. The focal length information forming means FVL mentioned in the foregoing is formed by the amplifier OP5 and the resistor FR. A comparator CP3 has one of its input terminals connected to the output terminal of the amplifier OP5 and the other input terminal to the output terminal of a voltage dividing circuit consisting of resistors R7 and R8. The detector DET which is described in the foregoing is formed by this comparator CP3. The comparator CP3 is arranged to produce a high level signal (hereinafter will be called "1") when the output of the amplifier OP5 is higher than a reference potential defined by the resistors R7 and R8 and to produce a low level signal (hereinafter will be called "0") when the output of the amplifier is lower than the reference potential.

The camera is further provided with a variable resistor DR which is interlocked with a focusing ring; and a buffer amplifier OP4. The buffer amplifier OP4 produces an output according to the resistance value of the variable resistor and the potential of the output of the amplifier OP4 increases as a setting distance value decreases. The amplifier OP4 and the variable resistor DR jointly form the distance signal forming means mentioned in the foregoing. Meanwhile, the aperture signal forming means AVL which is also mentioned in the foregoing is formed by a variable resistor AR. The potential of the resistance output of the variable resistor AR is arranged to become lower as the aperture of the lens is stopped down.

A variable resistor SR is interlocked with the film sensitivity setting means. An operational amplifier OP1 has a resistor R1 connected between one of its input terminals and its output terminal and is arranged to serve as an inverting amplifier. The potential of the output of the operational amplifier OP1 becomes higher as the setting value of film sensitivity becomes higher. The film sensitivity information forming means mentioned in the foregoing is formed jointly by this amplifier OP1 and the resistor SR.

Another operational amplifier OP3 is connected to the amplifier OP1 via a resistor R4 and to the amplifier OP4 via a resistor R5. The amplifier OP3 is also connected directly to the variable resistor AR. A resistor R6 is connected to the feedback line of the operational amplifier OP3 and the latter serves as an inverting amplifier. Therefore, the potential of the output of this amplifier OP3 becomes higher as the film sensitivity becomes lower or the object distance becomes farther or the aperture is stopped down to a greater degree. The computing circuit CAL mentioned in the foregoing is formed by this operational amplifier OP3.

An inverting amplifier is formed jointly by an operational amplifier OP2 and resistors R2 and R3. The output of the amplifier OP1 is arranged to be supplied to this amplifier OP2. The amplifier OP2, therefore, produces a lower voltage as the film sensitivity becomes higher.

The light sensitive element mentioned in the foregoing is formed by a photo transistor SP1. A capacitor C1 is series connected to the photo transistor SP1. A switch SW11 is interlocked with the synchronizing switch SW12 and is arranged to turn off when the switch SW12 turns on. The integration circuit iNT1 mentioned in the foregoing is formed by the capacitor C1 and the switch SW11.

Another light sensitive element mentioned in the foregoing is formed by a photo transistor SP2. The photo transistor SP2 has a capacitor C2 series connected thereto. A switch SW10 is interlocked with the synchronizing switch SW12. The switch SW10 is arranged to turn off when the switch SW12 turns on. The integration circuit iNT2 mentioned in the foregoing is formed by the capacitor C2 and the switch SW10.

Comparators CP1 and CP2 jointly form the light emission stop signal forming circuit which has been described in the foregoing. Meanwhile, the change-over circuit CSW which has been described also in the foregoing is formed jointly by an inverter I1, AND gates A1 and A2 and an OR gate OR1.

A buffer amplifier OP5 has one of its input terminals connected to the capacitor C1 while the output terminal of the amplifier OP5 is connected to the base of a transistor Tr1. A transistor Tr2 has its base and collector connected to each other while the collector is connected to the collector of the above-stated transistor Tr1. A transistor Tr3 has its emitter connected to the emitter of the transistor Tr2 and its base to the collector of the transistor Tr1. The collector of the transistor Tr3 is connected to a diode Di1. An operational amplifier OP6 has one of its input terminals connected to the diode Di1 and the other input terminal to a voltage dividing point in a series circuit composed of a feedback resistor and a resistor RLi1. These amplifiers OP5 and OP6, transistors Tr1, Tr2 and Tr3 and the resistor RLi1 constitute the suppressing means L1 mentioned in the foregoing. The suppressing means L1 produces an output which corresponds to a logarithmic value of the output of the capacitor C1.

Another suppressing means mentioned in the foregoing is formed jointly by operational amplifiers OP7 and OP8, transistors Tr4, Tr5 and Tr6, a diode Di2 and a resistor RLi2, which are connected in a manner similar to the above-stated parts of the suppressing means L1.

FIG. 6 shows by way of example the specific arrangement of the flash device ST shown in FIG. 4. The flash device is provided with a known main capacitor C101 which receives power supply from a power source PS via a resistor R101, a rectifying diode D101 and a coil L. A diode D102 which is parallel connected to the coil L is arranged to serve as a noise killer. A series circuit which consists of a resistor R102, a neon tube NE and a resistor R103 is a detection circuit which is arranged to detect the charge voltage of the main capacitor C101. One end of the neon tube NE of the circuit is connected to the cathode of a thyristor SCR 101 and is also connected to the terminal C disposed between the camera and the flash device. This thyristor SCR 101 forms a trigger circuit. The anode of the thyristor is connected to the main capacitor via a resistor R105 and the coil L. The cathode of the thyristor is connected to the trigger capacitor C103 through the primary winding of a trigger transformer TT. Further, the gate of the thyristor SCR 101 is connected to a resistor R104. A reference symbol XE indicates a known discharge tube. One of the electrodes of the discharge tube XE is connected to the main capacitor C101 via a thyristor SCR 102 for flash light emitting quantity control. The trigger electrode of the discharge tube XE is connected to the secondary winding of the above-stated trigger transformer. Parallel connected between the main electrodes of the main thyristor SCR 102 is a known circuit composed of a commutation capacitor C104 and an auxiliary thyristor SCR 103. Meanwhile, a known thyristor trigger circuit composed of resistors R106 and R108 and a capacitor C105 is connected to the gate of the main thyristor SCR 102. A series circuit composed of resistors R111 and R112, a capacitor C106, a diode D104 and a transistor TR101 is parallel connected to the series circuit composed of the discharge tube XE and the main thyristor SCR 102 and is arranged as an erroneous action preventing circuit to prevent the auxiliary thyristor SCR 103 from becoming conductive before the discharge tube XE begins to flash. This preventing circuit has the collector of the npn transistor TR101 connected via resistor R113 to the terminal B disposed between the flash device and the camera.

A photo transistor SP2 is disposed close to the discharge tube XE as shown in FIG. 7. The collector of the photo transistor SP2 is connected to the power source of the camera which is not shown. The emitter of the transistor SP2 is connected to the terminal A which is disposed between the camera and the flash device.

The embodiment shown in FIGS. 5, 6 and 7 operates in the following manner:

First, the following description covers a case where a wide angle lens is used. The resistance value of the resistor FR responds to the focal length information signal pin of the lens mounted on the camera and is thus set at a value corresponding to the focal length of the lens. The amplifier OP5 then produces a voltage corresponding to the resistance value. The voltage produced by the amplifier OP5 is arranged to increase as the focal length decreases. Thus the voltage produced from the operational amplifier OP5 becomes higher than the divided voltage of the resistors R7 and R8 when the lens mounted on the camera is of a focal length shorter than a prescribed focal length value, that is, when the lens is of a wider angle than a prescribed angle of view. Therefore, the comparator CP3 produces a "1" signal. The "1" signal is impressed on one of the input terminals of the AND gate A1. Further, the "1" signal is inverted by the inverter I1 into a "0" signal and this "0" signal is impressed on one of the input terminals of the AND gate A2. The AND gate A1 is for the TTL light adjusting mode and the other AND gate A2 for the distance light adjusting mode. The above-described process, therefore, selects the TTL light adjusting mode.

After completion of aperture adjustment and distance adjustment, a shutter release button depressing operation causes a mirror to be uplifted and a leading shutter curtain to travel. In response to this, the synchronizing switch SW12 turns on. The on signal of the switch SW12 is transmitted via the terminal C to the known trigger circuit of the flash device composed of the resistors R103 and R104, the capacitors C102 and C103, the thyristor SCR 101 and the transformer TT. This turns on the thyristor SCR 101. The electric charge of the capacitor C103 flows to the primary winding of the transformer TT. The transformer TT triggers the discharge tube XE and at the same time turns on the thyristor SCR 102. The discharge tube XE beings to flash.

Light reflected from the object caused by flash of the discharge tube irradiates the film through the aperture of the photo-taking lens. The film then reflects the light. The light reflected from the film is received by the light sensitive element SP1. The light sensitive element SP1 then produces a current corresponding to the intensity of the light incident thereon and has it flow between the collector and emitter thereof. Since the switch SW11 has turned off in response to the switch SW12 at that instant, the capacitor C1 is charged with this current. The charge voltage of the capacitor C1 is logarithmically suppressed by the suppressing means L1 and then is impressed upon the + input terminal of the comparator CP1. Meanwhile, a voltage corresponding to a film sensitivity value set at the resistor SR is impressed upon the − input terminal of the comparator CP1 via the amplifier OP2 which serves as an inversion amplifier. When the charge voltage of the capacitor C1 reaches a value corresponding to the set film sensitivity, the comparator CP1 produces a "1" signal as a flashing stop signal.

As mentioned in the foregoing, the voltage produced from the amplifier OP2 decreases as the film sensitivity value increases. Therefore, the length of time from the start of a flash to the issue of the flash stop signal from the comparator CP1 becomes shorter as the film sensitivity becomes higher. The "1" signal from the comparator CP1 is transmitted to the terminal B via the AND gate A1 and the OR gate OR1 With the "1" signal supplied to the terminal B, a gate current is supplied to the gate of the thyristor SCR 103 to turn on the thyristor. The electric charge of the commutation capacitor C104 is discharged through the thyristor SCR 103 to inversely bias the thyristor SCR 102. The thyristor SCR 102 then turns off to stop the discharge tube XE from flashing. As described above, with a wide angle lens used, the flash light quantity is adjusted in the TTL light adjusting mode.

When a telephoto lens which is of a longer focal length than a prescribed focal length value is used, the embodiment operates as follows:

The voltage produced from the amplifier OP5 in this instance is lower than the divided voltage obtained from the resistors R7 and R8. Accordingly, the comparator CP3 produces a "0" signal. The "0" signal is transmitted to one of the input terminals of the AND gate A1 and at the same time is inverted by the inverter I1 into a "1" signal. The "1" signal is transmitted to one of the input terminals of the other AND gate A2. The AND gate A1 is thus inhibited from operating while the AND gate A2 which is provided for the distance light adjusting mode is selected. After completion of distance and aperture adjusting actions, when the shutter release button is depressed for shutter release, the synchronizing switch SW12 turns on in the same manner as in the case of the above-stated TTL light adjusting mode. A signal representative of the turning on of the switch SW12 causes the discharge tube XE to begin to flash. The flash of the discharge tube XE is received by the light sensitive element SP2 which is disposed close to the discharge tube XE as shown in FIG. 7. The light sensitive element SP2 then produces a current which corresponds to the intensity of the flash. This current flows from the terminal A to the camera side. Meanwhile, at the time of commencement of the flashing action, the switch SW10 has turned off in response to the synchronizing switch SW12. Therefore, the capacitor C2 is charged with the current produced by the above-stated light sensitive element SP2.

The light sensitive element SP2 is thus arranged to receive the light directly from the discharge tube XE as mentioned above. The quantity of the electric charge of the capacitor C2, therefore, represents the quantity of the flash light emitted from the discharge tube. The voltage produced from the capacitor C2 is logarithmically suppressed by the suppressing means L2 and, after that, is impressed on the + input terminal of the comparator CP2.

The above-stated amplifier OP3 at that instant has received the outputs of the amplifiers OP1 and OP4 corresponding to a film sensitivity value and an object distance value and the output voltage of the resistor AR corresponding to an aperture value. The amplifier OP3 computes these information values to obtain a quantity of the flash's light required for a correct exposure and thus produces a voltage corresponding to that light quantity of the flash. The output voltage of the amplifier OP3 is impressed on the − input terminal of the above-stated comparator CP2. The voltage and the output of the above-stated suppressing means L2 are compared with each other. When the logarithmic value of the charge voltage of the capacitor C2, i.e., the quantity of the light from the flash discharge tube, reaches the light quantity required for a correct exposure as represented by the output of the amplifier OP3, the comparator CP2 produces a "1" signal as a flashing stop signal. The AND gate A2 then produces a "1" signal in response to the "1" signal of the comparator CP2. The "1" signal is transmitted to the gate of the thyristor SCR 103 of the flash device. Then, the flash action is brought to a stop in the same manner as in the case of the TTL light adjusting mode. The flash light quantity control is thus accomplished in the distance light adjusting mode when a telephoto lens is used.

In this embodiment, as has been described above, the kind of lens to be used is detected. The degree of exposure is controlled in the distance light adjusting mode when the lens is a telephoto lens and in the TTL light adjusting mode when the lens is a wide angle lens with change-over from one mode to the other arranged to be automatically accomplished. The embodiment, therefore, is capable of automatically carrying out flash exposure control in the light adjusting mode that is most suited for the lens in use.

Figure 8:
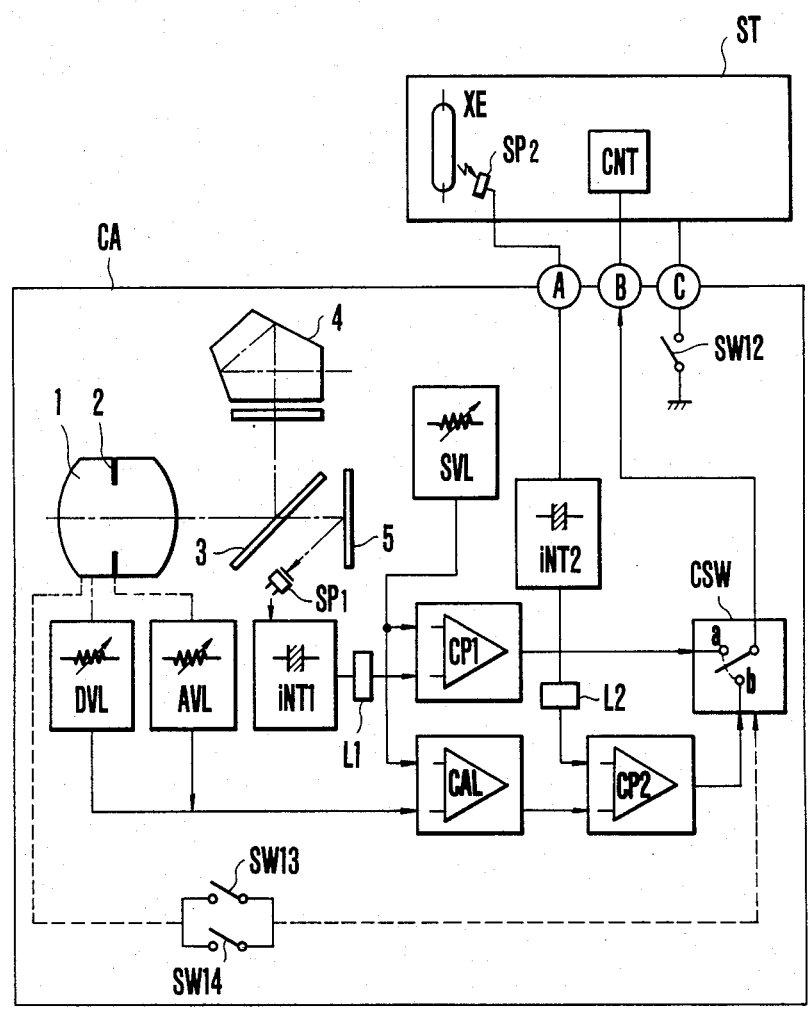
FIG. 8 is a block diagram showing a flash photographing system as another embodiment of the invention.

FIG. 8 is a block diagram of a flash photographing system according to the invention as another embodiment example thereof. In FIG. 8, parts which are the same as those shown in FIG. 4 are indicated by the same reference numerals and symbols as those used in FIG. 4. This embodiment includes switches SW13 and SW14 which are disposed on the photo-taking lens. The switch SW13 is a manual mode selection switch which is arranged to be manually turned on and off. The switch SW14 is a mode selection switch which is arranged to turn on when a transmission light quantity varying member such as an ND filter or the like is mounted on the lens and to produce a mode change-over signal with such a member mounted. The switches SW13 and SW14 are connected in parallel with each other.

A mode change-over circuit CSW is arranged to connect with a contact "a" when the switch SW13 or SW14 turns on and to connect with a contact "b" when the switch turns off. The operation of this embodiment is as follows:

Let us assume that, in photographing, a transmission light quantity reducing member such as an ND filter or the like is mounted on the photo-taking lens 1. Under this condition, the switch SW14 turns on and the change-over circuit CSW connects with a contact "a". In this instance, the flash's light quantity control is carried out in the TTL light adjusting mode by means of the output of the flashing stop signal forming circuit CP1 in the same manner as in the case of FIG. 4.

In cases where flash photography is to be carried out without mounting any filter or the like on the lens 1, the embodiment operates as follows: Both the switches SW13 and SW14 are set to be turned off. The change-over circuit CSW is connected with the contact "b". Therefore, in that instance, the flash's light quantity control is accomplished in the distance light adjusting mode with flash brought to a stop by means of the output of the flash stop signal forming circuit CP2 in the same manner as in the case of FIG. 4.

The switch SW13 turns on when an operation member which is not shown but is disposed on the lens 1 is operated. With the operation member operated in that manner, the change-over circuit CSW connects with the contact "a" and the flash picture is taken in the TTL light adjusting mode even when no filter or the like is mounted on the lens.

In this embodiment, as has been described above, the flash's light quantity is controlled normally in the distance light adjusting mode to prevent an exposure error due to variation in the reflection factor of the object to be photo-granted. When an ND filter or the like is mounted on the lens on the other hand, the TTL light adjusting mode is automatically selected. In that instance, therefore, the flash's light quantity can be correctly adjusted without being affected by the transmission light quantity reducing action of the filter.

Figure 9:
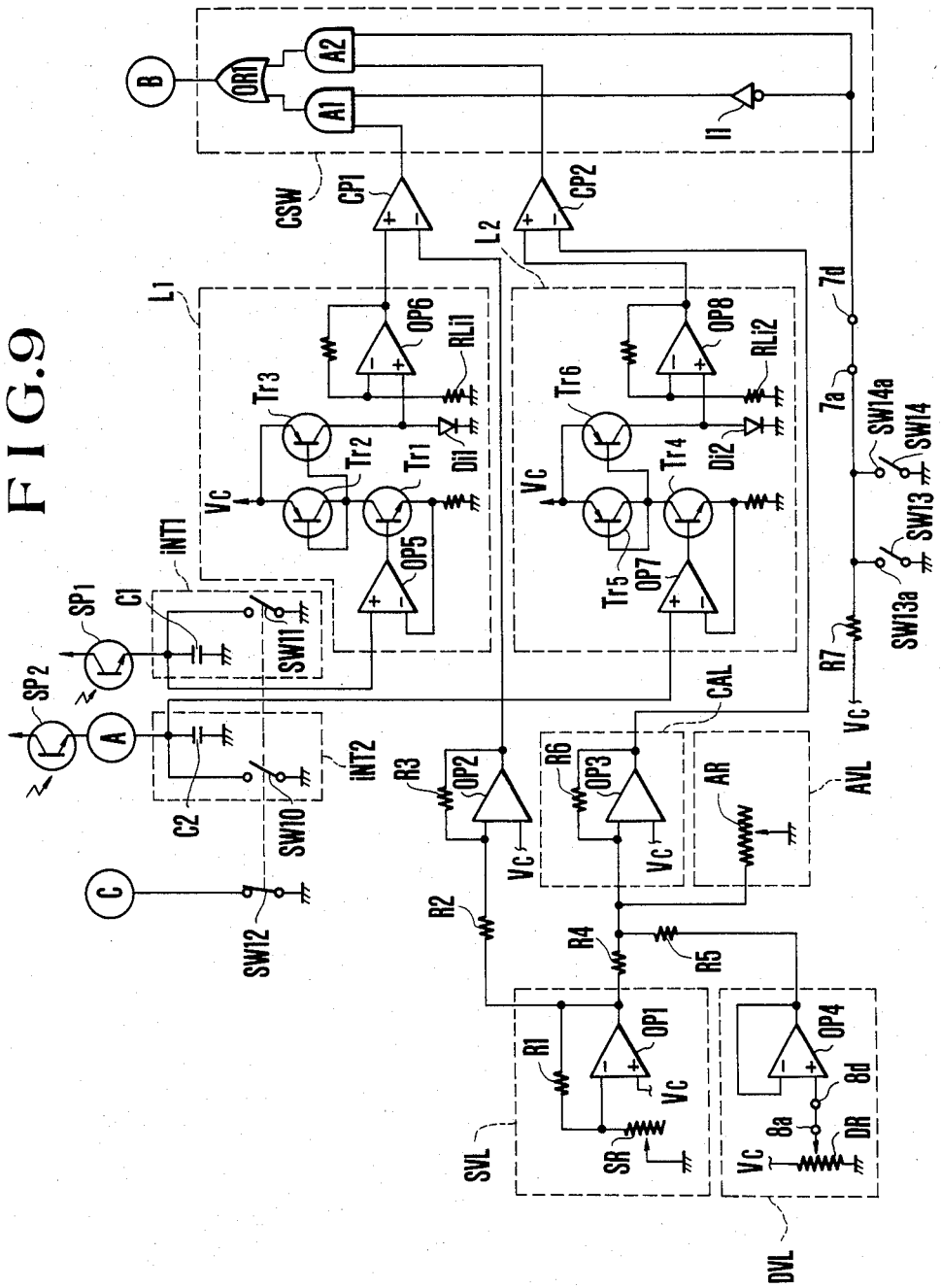
FIG. 9 is a circuit diagram showing an example of a camera CA shown in FIG. 8.

More specific description of the flash photographing system shown in FIG. 8 will be given below with reference to FIGS. 9 and 10;

FIG. 9 shows by way of example the specific arrangement of the camera CA shown in FIG. 8. In FIG. 9, the parts which are identical with those shown in FIG. 5 are indicated by the same reference symbols.

Figure 10:
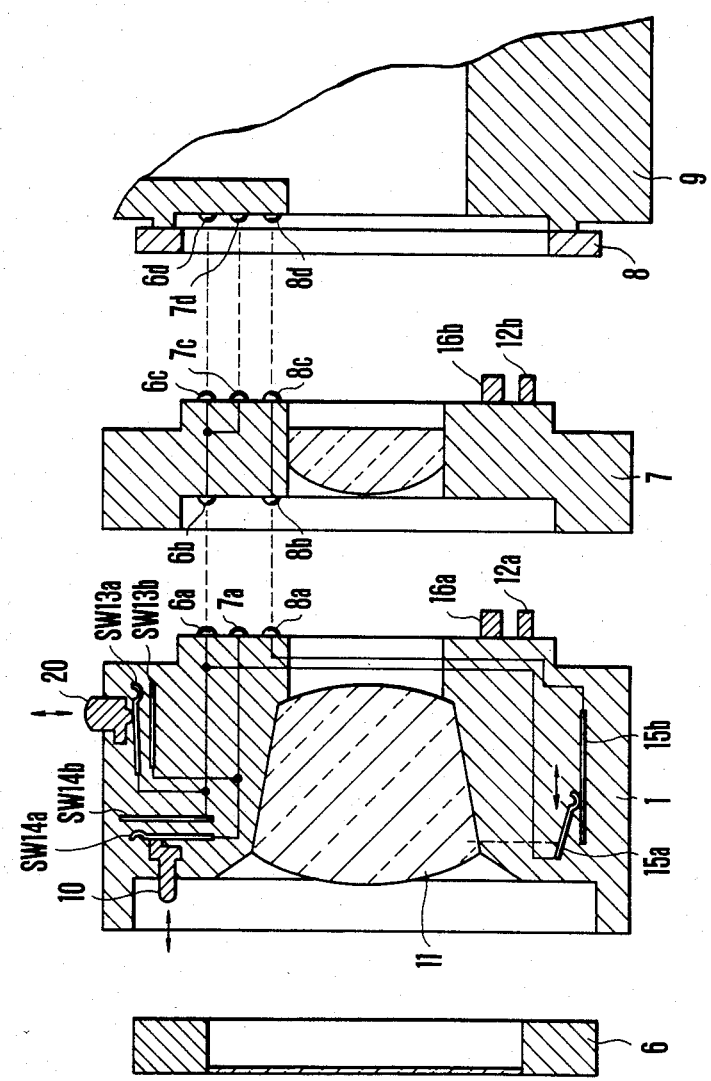
FIG. 10 is a sectional view showing by way of example a photo-taking lens barrel, a filter and an intermediate adapter to be used for a flash photographing system according to the present invention.

FIG. 10 shows by way of example the arrangement of the photo-taking lens and an intermediate adapter such as a tele converter which are applicable to the flash photographing system according to the present invention. Referring to FIG. 10, a reference numeral 1 indicates a lens barrel of the phototaking lens shown in FIG. 8. A numeral 11 indicates the lens. The lens barrel 1 is provided with the above-stated switch SW14 consisting of a fixed contact SW14b and a moving contact SW14a which is pushed by a pin member 10; and the above-stated switch SW13 consisting of a fixed contact SW13b and a moving contact SW13a which is arranged to be responsive to a manual operation member 20 for mode change-over. These switches SW13 and SW14 are parallel connected as shown in FIG. 9. A ground contact 6a is disposed on the reverse side of the lens barrel. The above-stated switches SW13 and SW14 are connected between the ground contact 6a and a mode change-over signal contact 7a. The resistor DR shown in FIG. 9 is disposed on a resistor substrate 15b. A contact piece 15a is arranged to be slidable over the substrate 15b in response to a distance ring which is not shown but is provided on the lens barrel. The contact piece and the substrate form the above-stated set distance signal forming means DVL. The contact piece is connected to the ground contact 6a while the substrate 15b is in connection with a distance signal contact 8a.

An automatic stopping down lever pin 12a is arranged for aperture control. An aperture signal lever pin 16a is arranged to transmit the step number of set aperture of the photo-taking lens to the camera. The front of the lens barrel is provided with a mount for attaching a filter 6 thereto. With the filter 6 attached to the lens barrel, a pin member 10 is pushed by the filter to turn on the switch SW14.

A camera body 9 is provided with a mount 8 for mounting the photo-taking lens barrel on the camera body. The camera body is further provided with contacts 6d, 7d and 8d which are arranged to connect with contacts 6a, 7a and 8a which are disposed on the lens barrel. An intermediate adapter such as a tele converter or the like is arranged to be interposed between the lens barrel 1 and the camera body 9. The adapter 7 is provided with contacts 6b and 8b which are arranged on the front side of the adapter to confront the contacts 6a and 8a disposed on the lens barrel. The adapter 7 is further provided with contacts 6c, 7c and 8c which are arranged on the reverse side of the adapter to confront the contacts 6d, 7d and 8d which are disposed on the camera body. The contacts 8b and 8c are connected to each other by a signal line. The contact 6b is connected to the contacts 6c and 7c also by a signal line.

The intermediate adapter 7 is further provided with an aperture signal lever pin 16b and an automatic signal lever pin 12b.

The embodiment shown in FIGS. 9 and 10 operates in the following manner: The description below first covers a case where photography is to be carried out with the flash device which is shown in FIGS. 6 and 7 and with a filter 6 mounted on the photo-taking lens. With the filter 6 which is shown in FIG. 10 mounted on the lens barrel 1, the pin member 10 is pushed by the filter to bring the contacts SW14a and SW14b into contact with each other. With the lens barrel 1 mounted on the camera body 9, the contacts 6a and 7a are in connection with the contacts 6d and 7d respectively. Information on the turned on state of the switch SW14 with the contacts SW14a and SW14b brought into contact with each other is transmitted to the inside of the camera body.

With the switch SW14 turned on, a "0" signal is impressed on one of the input terminals of the AND gate A2 which is shown in FIG. 9 while a "1" signal is impressed through the inverter I1 on one of the input terminals of the AND gate A1.

The AND gate A1 is provided for the TTL light adjusting mode and the AND gate A2 for the distance light adjusting mode. In this instance, therefore, the TTL light adjusting mode is selected. After completion of aperture and distance adjusting actions, the mirror of the camera moves upward and the leading curtain of the shutter travels when the shutter release button is depressed. In response to this, the synchronizing switch SW12 turns on. A signal representing the turned on state of the switch SW12 is transmitted via the terminal C to the known trigger circuit of the flash device (FIG. 6) consisting of the resistors R103 and R104, the capacitors C102 and C103, the thyristor SCR 101 and the transformer TT. This causes the flash device to operate and to begin to flash in the same manner as in the case of the first embodiment described in the foregoing Light from the flash of the discharge tube and reflected by the object irradiates the film through the filter and the aperture of the photo-taking lens. Then, light reflected by the film is received by the light sensitive element SP1. The light sensitive element SP1 produces a current flow, corresponding to the intensity of the reflected light incident thereon, between its collector and emitter. Since the switch SW11 has turned off in response to the switch SW12, this current of the light sensitive element SP1 charges the capacitor C1. When the electric charge of the capacitor C1 reaches a predetermined value, the comparator CP1 produces a "1" signal. The "1" signal is supplied to the flash device via the gate A1, the amplifier OP1 and the terminal B in the same manner as in the first embodiment shown in FIG. 5. With the "1" signal thus supplied to the flash device, the flash of the flash device ceases and the flash's light quantity control is carried out in the TTL light adjusting mode.

When a member such as an ND filter that alters the transmission light quantity of the light incident on the lens is mounted on the lens barrel, flash photography is automatically carried out in the TTL light adjusting mode as described above. This ensures appropriate flash light quantity adjustment irrespectively of any change in the transmission light quantity coming through the lens.

For flash operation of the embodiment without using a filter, the contacts SW14a and SW14b and contacts SW13a and SW13b of the photo-taking lens are not in contact with each other. Accordingly, the connection between the contacts 6a and 7a is left open. An open signal is introduced via the contacts 6d and 7d into the camera body. The open signal from the contacts 6a and 7a is impressed as a "1" signal on one of the input terminals of the AND gate A2. Meanwhile, the signal is turned into a "0" signal through the inverter I1 and then is impressed on one of the input terminals of the AND gate A1. In this instance, therefore, the use of the AND gate A1 is inhibited and, in place of it, the AND gate A2 is selected to carry out control in the distance light adjusting mode.

When the distance ring provided on the lens barrel is operated to make distance adjustments, the contact piece 15a slides over the resistor substrate 15b to set a resistance value corresponding to a setting value of distance. Since the substrate 15b and the contact piece 15a are connected between the contacts 6a and 8a, the resistance value between the contacts 6a and 8a is introduced into the camera body via the contacts 6d and 8d. As mentioned in the foregoing, the substrate 15b and the contact piece 15a form the resistor DR shown in FIG. 9. Therefore, the amplifier OP4 produces a voltage corresponding to information on the distance setting.

Further, when an aperture value is set by operating an aperture setting ring provided on the lens barrel, the setting value of aperture is introduced into the camera body via the aperture signal lever pin 16a and is set in the form of a resistance value of the resistor AR.

Distance and aperture adjusting actions are accomplished in the manner described. After completion of these actions, when the shutter release button is depressed to initiate a shutter release action, the synchronizing switch SW12 is caused to turn on in the same manner as in the above-stated TTL light adjusting mode. A signal produced with the switch SW12 turned on causes the discharge tube XE to begin to flash. The light of the discharge tube is received by the light sensitive element SP2 disposed close to the discharge tube as shown in FIG. 7. The light sensitive element SP2 then produces a current corresponding to the intensity of the flash and the current flows to the camera via the terminal A. Since the switch SW10 has turned off in response to the synchronizing switch SW12 at the start of flashing, the capacitor C2 is charged with the current produced by the light sensitive element SP2. Therefore, as mentioned in the description of the first embodiment with reference to FIG. 5, the comparator CP2 produces a signal when the charge voltage of the capacitor C2 reaches a value corresponding to a flash light quantity determined by the setting values of distance, film sensitivity and the aperture of the lens. This signal which is a "1" signal then arrives at the flash device to bring the flashing action thereof to a stop. With no filter or the like used, the flash photography operation is thus carried out in the distance light adjusting mode. Therefore, the flash's light quantity can be adjusted to a correct value without being affected by variations of the reflection factor of the object to be photographed. Further, if the operation member 20 is depressed on the lens barrel, the contacts SW13a and SW13b come into contact with each other even when using no filter. Therefore, the switch SW13 turns on to have an on signal impressed between the contacts 6a and 7a. With the operation member thus operated, flash photographing is accomplished in the TTL light adjusting mode in the same manner as when using a filter.

Next, when an intermediate adapter such as a tele converter or the like is interposed in between the lens barrel 1 and the camera body 9, the embodiment operates as follows: The contacts 6c and 7c of the intermediate adapter 7 are short circuited with each other. Hence, an on signal is impressed between the contacts 6d and 7d of the camera body 9 when the intermediate adapter is mounted on the camera body. In this instance, therefore, the flash's light quantity is controlled in the TTL light-adjusting mode in the same manner as when using a filter. The arrangement of the embodiment thus ensures a correct exposure even when flash photography is carried out at an aperture value different from an aperture value set on the lens barrel with an intermediate adapter such as a tele converter.

Figure 11:
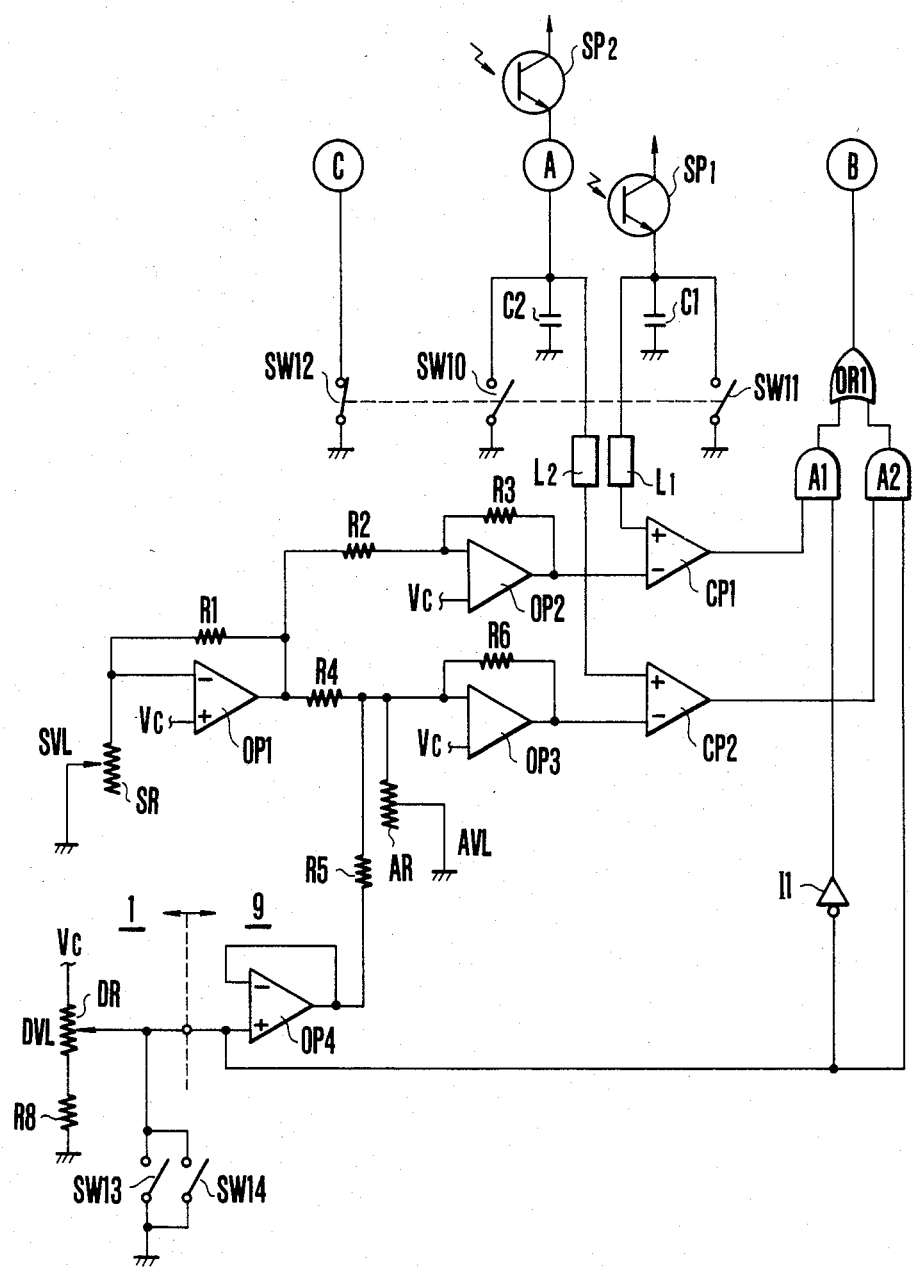
FIG. 11 is a circuit diagram showing another example of the camera shown in FIG. 9.

FIG. 11 is a circuit diagram showing another embodiment of the camera shown in FIG. 9. In FIG. 11, the parts which are identical with those shown in FIG. 9 are indicated by the same reference symbols. In the embodiment shown in FIG. 11, a resistor R8 is series connected to the distance information setting variable resistor DR. The potential at the connection point of the resistor R8 is arranged to become higher than the threshold levels of the AND gate A2 and the inverter I1. The switches SW13 and SW14 are parallel connected to the above-stated resistor. In this arrangement, the functions of a distance information transmitting terminal and a mode change-over signal transmitting terminal are arranged to be performed by the same terminal to permit reduction in the number of terminals. The operation of the embodiment shown in FIG. 11 is similar to that of the embodiment shown in FIG. 9 and thus requires no further description. In these specific embodiments, a filter and a tele converter have been described as accessories that vary the transmission light quantity. However, it goes without saying that, in accordance with this invention, they may be replaced with any other accessories of that kind.

In the flash photographing system according to the invention, as described in the foregoing, the flash's light quantity control is arranged to be carried out normally in the distance light adjusting mode and this mode is arranged to be automatically shifted to the TTL light adjusting mode where a wide angle lens is used or where a transmission light quantity varying member such as a filter or the like is used, so that flash photography always can be performed in a suitable light adjusting mode.

What we claim:
1. A flash photography system comprising a flash device and a camera, said system including:
   (a) distance information signal forming means for forming information on a distance to an object to be photographed;
   (b) a flash exposure degree control circuit arranged to operate either in a first mode in which the degree of flash light exposure is controlled on the basis of the distance information from said distance information signal forming means or in a second mode in which a quantity of reflected light coming from the object as a result of illumination of the object by a flash from the flash device is detected and the degree of flash exposure is controlled on the basis of the detected quantity of the reflected light;

(c) detecting means for detecting information on the focal length of a photo-taking lens mounted on the camera; and (d) a selection circuit arranged to select the first mode of the flash exposure degree control circuit when the focal length detected by said detecting means is longer than a prescribed focal length and to select the second mode when the detected focal length is shorter than the prescribed focal length.

2. A flash photographic system according to claim 1, wherein said flash light exposure degree control circuit, in the first mode, controls a time for terminating flash light generation by said flash device on the basis of said distance information and, in the second mode, terminates the flash light generation by said flash device when said quantity of the reflection light from the object reaches a prescribed value.

3. A flash photography system comprising:
(A) a flash device having:
 (a) flash means; and
 (b) a flash quantity control circuit arranged to perform either a first flash quantity control function in which the quantity of light is controlled on the basis of distance information or a second flash quantity control function in which the quantity of light is controlled on the basis of reflected light coming from an object to be photographed as a result of illumination of the object by a flash from the flash mean; and
(B) a camera having:
 (a) detecting means for detecting information on the focal length of a photo-taking lens mounted on the camera; and
 (b) selecting means for selecting said first function when the focal length detected by said detecting means is longer than a prescribed focal length and for selecting said second function when the detected focal length is shorter than the prescribed focal length.

4. A flash photography system according to claim 3, wherein said flash quantity control circuit includes a control portion which controls a time for terminating flash light generation by said flash means; said control portion being arranged to control the flash generation terminating time either on the basis of said distance information or on the basis of information on said reflected light coming from the object through a photo-taking lens as a result of illumination of the object by the flash; and said selecting means being arranged to transmit said distance information to said control portion when the detected focal length is longer than the prescribed focal length and to transmit said information on said reflection light to the control portion when the detected focal length is shorter than the prescribed focal length.

5. A flash photography system comprising:
(A) a flash device having:
 (a) flash means; and
 (b) a flash quantity control circuit having a first flash quantity controlling function which is to be performed in accordance with a first flash exposure degree control mode based on distance information and a second flash quantity controlling function which is to be performed in accordance with a second flash exposure degree control mode based on the quantity of a reflected light coming from an object to be photographed as a result of illumination of the object by said flash means; and (B) a camera having:
 (a) detecting means for detecting information on the focal length of a photo-taking lens mounted on the camera;
 (b) a flash exposure degree control circuit arranged to operate either in said first or second flash light exposure degree control mode; and
 (c) selecting means for selecting said first mode and said first function when the focal length detected by said detecting means is longer than a prescribed focal length and for selecting said second mode and said second function when the detected focal length is shorter than the prescribed focal length.

6. A flash photographing system comprising:
(A) a flash device having:
 (a) flash means; and
 (b) an adjusting circuit arranged to adjust the quantity of light generated by said flash means; and
(B) a camera having:
 (a) detecting means for detecting information on the focal length of a photo-takng lens mounted on the camera;
 (b) a flash exposure control circuit arranged to operate either in a first mode in which the light generation quantity to be adjusted by said adjusting circuit is determined on the basis of information on a distance to an object to be photographed or in a second mode in which a quantity of reflected light coming from the object as a result of illumination of the object by a flash light from the flash device is detected and the flash light generation quantity to be adjusted by said adjusting circuit is determined on the basis of the detected quantity of the reflected light; and
 (c) selecting means for selecting said first mode when the focal length detected by said detecting means is longer than a prescribed focal length and for selecting said second mode when the detected focal length is shorter than the prescribed focal length.

7. A camera adapted for use with a flash device including flash means and an adjusting circuit for adjusting the quantity of light emission from said flash means, said camera comprising:
(a) light receiving means for receiving reflected light coming via the aperture of a photo-taking lens from an object to be photographed as a result of light emission from said flash means;
(b) detecting means for detecting the focal length of said photo-taking lens;
(c) a control circuit arranged to cause said adjusting circuit to adjust the quantity of light emission either on the basis of the output of said light receiving means or on the basis of a distance to the object; and
(d) selecting means for having said control circuit cause said adjusting circuit perform said adjustment on the basis of the object distance when the focal length detected by said detecting means is longer than a prescribed focal length or on the basis of the output of said light receiving means when the detected focal length is shorter than the prescribed focal length.

8. A camera usable with a flash device arranged to adjust the flash devices light quantity on the basis of information on the distance to an object to be photographed, said camera comprising:
(a) light receiving means for receiving reflected light coming via the aperture of a photo-taking lens from an object to be photographed as a result of flash light emission by said flash means;
(b) detecting means for detecting the focal length of said photo-taking lens; and
(c) selecting means for causing said flash device to adjust the light quantity on the basis of the output of said light receiving means instead of the information on the distance to the object when the focal length detected by said detecting means is shorter than a prescribed focal length.

9. A photographic camera adapted for use in a flash photography system which includes the camera and a flash device provided with an adjusting circuit for adjusting the quantity of light emission and is arranged to control the degree of exposure for flash photography on the basis of information on the distance to an object to be photographed, said camera comprising:
(a) light receiving means for receiving reflected light coming via the aperture of a photo-taking lens from an object to be photographed as a result of light emission by said flash device;
(b) detecting means for detecting the focal length of said photo-taking lens; and
(c) a change-over circuit for shifting the control of the degree of exposure by said adjusting circuit from the control based on the object distance information to control based on the output of said light receiving means, said change-over circuit being arranged to cause said adjusting circuit to adjust the quantity of light emission on the basis of the output of said light receiving means when the focal length detected by said detecting means is shorter than a prescribed focal length.

10. A flash device comprising:
(a) flash means; and
(b) a control circuit operable in a distance light adjusting mode and a second light adjusting mode in which the control circuit adjusts the quantity of light on the basis of a quantity of a light reflected by an object to be photographed as a result of a flash from said flash means, said control circuit being arranged to perform flash exposure control in said distance light adjusting mode when the focal length of a photo-taking lens mounted on a camera as detected by focal detecting means is longer than a prescribed focal length and in said second mode when said detected focal length is shorter.

11. A flash photography system including a flash device and a camera, said system comprising:
(a) distance information signal forming means for forming information on a distance to an object to be photographed;
(b) a flash exposure degree control circuit arranged to operate either in a first mode in which the degree of flash exposure is controlled on the basis of the distance information from said distance information signal forming means or in a second mode in which a quantity of light reflected by the object as a result of illumination of the object by light from the flash device is detected and the degree of flash exposure is controlled on the basis of the quantity of the reflection light detected; and (c) a change-over circuit arranged to shift the mode of said flash exposure degree control circuit from the first mode to the second when an accessory varies the quantity of a light transmitted through the photo-taking lens of the camera is mounted with the lens.

12. A system as in claim 11, wherein said accessory is a filter.

13. A system as in claim 11, wherein said assessory is an intermediate adapter.

14. A flash photography system comprising:
(A) a flash device having:
(a) flash means; and
(b) a flash quantity control circuit having a first flash quantity controlling function which is to be performed in accordance with a first exposure degree control mode based on distance information and a second flash quantity controlling function which is to be performed in accordance with a second flash exposure degree control mode based on a quantity of light reflected by an object to be photographed as a result of illumination of the object of said flash means; and
(B) a camera having;
(a) a flash exposure degree control circuit arranged to operate either in said first or second flash exposure degree control mode; and
(b) a change-over circuit arranged to shift the function and the mode of said flash exposure degree control circuit from the first function and mode to the second function and mode when an accessory that varies the quantity of a transmission light passing through the photo-taking lens of the camera is mounted with the lens.

15. A system as in claim 14, wherein said accessory is a filter.

16. A system as in claim 14, wherein said accessory is an intermediate adapter.

17. A flash photography system comprising:
(A) a flash device having:
(a) flash means; and
(b) a flash quantity control circuit arranged to perform either a first flash quantity controlling function in which the quantity of flash is controlled on the basis of distance information or a second flash quantity controlling function in which the quantity of flash is controlled on the basis of a light reflected by an object to be photographed as a result of illumination of the object by a flash light from the flash means; and
(B) a camera having:
(a) a change-over circuit arranged to shift the function of said to flash light exposure degree control circuit from the first function to the second when an accessory that varies the quantity of light transmitted through the photo-taking lens of the camera is mounted with the lens.

18. A system as in claim 17, wherein said accessory is a filter.

19. A system as in claim 17, wherein said secondary is an intermediate adapter.

20. A flash photography system comprising:
(A) a flash device having:
(a) flash means; and
(b) an adjusting circuit arranged to adjust the quantity of flash light generated by said flash means; and
(B) a camera having:

(a) a flash exposure control circuit arranged to operate either in a first mode in which the generated light quantity to be adjusted by said adjusting circuit is determined on the basis of information on a distance to an object to be photographed or in a second mode in which a quantity of light reflected by the object as a result of illumination of the object by a flash light from the flash device is detected and the generated light quantity to be adjusted by said adjusting circuit is determined on the basis of a quantity of the reflected light detected; and (b) a change-over circuit arranged to shift the mode of said flash light exposure control circuit from the first mode to the second when an accessory that varies the quantity of a transmission light passing through the photo-taking lens of the camera is mounted on the lens.

21. A system as in claim 20, wherein said accessory is a filter.

22. A system as in claim 20, wherein said accessory is an intermediate adapter.

23. A photographic camera adapted for use with a flash device including flash means and an adjusting circuit arranged to adjust the quantity of light emission from said flash means, said camera comprising:
(a) light receiving means for receiving reflected light coming via the aperture of a photo-taking lens from an object to be photographed as a result of flash light emission by said flash means;
(b) detecting means for detecting the focal length of said photo-taking lens; and
(c) a change-over circuit arranged to shift the control mode of said adjusting circuit from operation on the basis of the distance to the object to operation on the basis of the output of said light receiving means when an accessory that varies the quantity of light passing through the photo-taking lens of the camera is mounted with the lens.

24. A camera as in claim 23, wherein said accessory is a filter.

25. A camera as in claim 23, wherein said accessory is an intermediate adapter.

26. A photographic camera usable with a flash device arranged to adjust flash light quantity on the basis of information on the distance to an object to be photographed, said camera comprising:
(a) light receiving means for receiving a reflection light coming via the aperture of a photo-taking lens from an object to be photographed as a result of flash light emission by said flash means; and
(b) a change-over circuit arranged to shift the operating mode of said flash device from said adjustment of the flash light quantity performed on the basis of information on the object distance to adjustment thereof to be performed on the basis of the output of said light receiving means when an accessory such as a filter or an intermediate adapter or the like that varies the quantity of a transmission light passing through the photo-taking lens of the camera is mounted on the lens.

27. A camera as in claim 26, wherein said accessory is a filter.

28. A camera as in claim 26, wherein said accessory is an intermediate adapter.

29. A camera adapted for use in a flash photographing system which includes the camera and a flash device provided with an adjusting circuit for adjusting light quantity and is arranged to control the degree of exposure of flash photography on the basis of information on the distance to an object to be photographed, said camera comprising:
(a) light receiving means for receiving reflected light coming via an aperature of a photo-taking lens from an object to be photographed as a result of light emission by said flash means; and
(b) a change-over circuit for shifting said flash exposure control from the control to be performed on the basis of the object distance information to a control to be performed on the basis of the output of said light receiving means, said change-over circuit being arranged to cause said adjusting circuit to adjust the flash light quantity on the basis of the output of said light receiving means when an accessory that varies the quantity of light passing through the photo-taking lens of the camera is mounted with the lens.

30. A camera as in claim 29, wherein said accessory is a filter.

31. A camera as in claim 29, wherein said accessory is an intermediate adapter.

32. A flash device comprising:
(a) flash means; and
(b) a control circuit having a distance light adjusting mode and a second light adjusting mode in which the control circuit adjusts the quantity of light on the basis of a reflected light coming from an object to be photographed as a result of a flash by said flash means, said control circuit being arranged to perform flash exposure control by shifting said distance light adjusting mode to said second light adjusting mode when an accessory that varies the quantity of a transmission light passing through the photo-taking lens of a camera is mounted on the photo-taking lens.

* * * * *